United States Patent [19]

Itoh et al.

[11] Patent Number: 5,251,542
[45] Date of Patent: Oct. 12, 1993

[54] HEAT INSULATING COOKING VESSEL

[75] Inventors: Seiichi Itoh; Takeshi Kuwana; Shigeru Tsuchiya, all of Niigata, Japan

[73] Assignee: Nippon Sanso Corporation, Tokyo, Japan

[21] Appl. No.: 27,454

[22] Filed: Mar. 8, 1993

[51] Int. Cl.5 .............. A47J 27/00; A47J 36/00; A45C 11/20
[52] U.S. Cl. .................... 99/403; 99/340; 206/545; 206/546; 220/412; 220/902; 220/912
[58] Field of Search .............. 99/337, 339, 340, 403, 99/410–418, 467; 126/369, 375–377, 390; 206/541, 544, 545, 546, 549; 220/400, 411–413, 408, 428, 522, 902, 912

[56] References Cited

U.S. PATENT DOCUMENTS

| | | | |
|---|---|---|---|
| 1,331,530 | 2/1920 | Shaw | 99/403 |
| 1,625,999 | 4/1927 | Irish | 99/403 |
| 2,781,937 | 2/1957 | Piker | 220/412 |
| 3,670,918 | 6/1972 | Mitchell | 206/545 X |
| 3,811,558 | 5/1974 | Burk | 206/545 |
| 4,258,695 | 3/1981 | McCarton et al. | 126/375 |
| 4,360,105 | 11/1982 | Williams | 206/545 X |
| 5,031,519 | 7/1991 | Toida et al. | 99/340 |
| 5,056,424 | 10/1991 | Lai | 99/340 X |
| 5,092,229 | 3/1992 | Chen | 99/403 X |
| 5,116,240 | 5/1992 | Wischhusen et al. | 206/545 |

FOREIGN PATENT DOCUMENTS 2448885 10/1980 France ............... 206/545
3-10920 3/1991 Japan .

Primary Examiner—Timothy F. Simone
Attorney, Agent, or Firm—Biebel & French

[57] ABSTRACT

In a heat insulating cooking vessel wherein a cooking pot with a lid element is contained in a freely removeable fashion within the inner space of a heat insulating container consisting of a heat insulating container and a lid which closes the mouth portion of this container member, the present invention comprises attachment shafts which are formed projecting outward from both side walls of the container member of the heat insulating container; a grip handle which is attached to the container member via the aforesaid attachment shafts and can be freely raised or lowered; a locking piece which is formed projecting outward from the side of the lid which is positioned above the attachment shafts when the container member is covered by the lid; a concave interlocking portion, which covers the locking piece when the container member is covered with the lid, and which is formed to the attachment parts of the handle grip attached to the sides of the container member; openings formed in the attachment parts of the aforesaid grip handle, the openings communicating with the aforesaid interlocking portion and permitting free movement of the lock in the upward direction when the aforesaid grip handle is lowered on one side of the container member; and a bearing face which presses the locking piece down on the lid and presses the lid down on the mouth portion of the container member when said grip handle is placed in the upright position or is lowered to the other side of said container member.

11 Claims, 10 Drawing Sheets

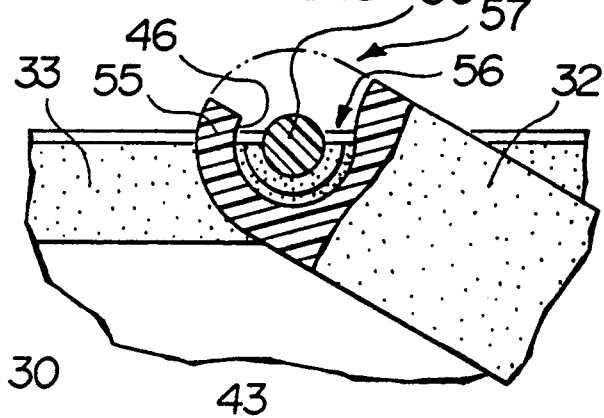
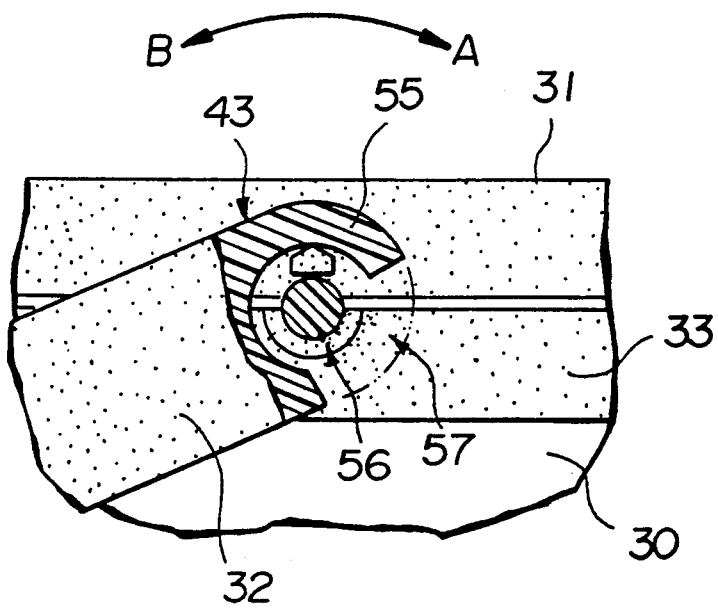

HEAT INSULATING COOKING VESSEL

BACKGROUND OF THE INVENTION

1. Technical Field

The present invention relates to a heat insulating cooking vessel which may be suitably utilized for a cooking process by which food semi-cooked by heating is kept warm and brought to a completely cooked state.

2. Technical Background

In general, the process of heating and cooking food involves electric heat or a direct flame. However, such a cooking process makes food susceptible to breakdown or scorching due to heating, and consumes a large amount of energy.

A cooking process wherein raw vegetables or grains are immersed in an appropriate quantity of boiling water or a boiling seasoned soup, or semi-cooked food is kept warm for an extended period of time to bring it to a completely cooked state, have been advanced in recent years as processes which resolve the above-mentioned problems.

Conventional heat insulating cooking vessels such as that shown, for example, in Japanese Utility Model 3-10920 (Utility Model Appln., Publication No. Heisei 3-10920), wherein a freely hinged handle is attached at the edge of the mouth of the cooking pot, and an engaging portion is provided to this handle, so that when the handle is operated, the aforesaid engaging portion contacts with a portion of the pot, thereby preventing the food contained therein from easily spilling, are available as heat insulating cooking vessels wherein cooking is performed by placing a cooking pot, containing a food material which has been preheated until semi-cooked, in the heat insulating vessel, closing the vessel to seal it, and maintaining the cooking pot and contents therein in a heat insulating state for a desired period of time.

However, the aforementioned conventional heat insulating cooking vessel has the following problems. Namely, because there is no handle on the heat insulating cooking vessel itself, when carrying it, it is cumbersome to transport. Further, because the secure fit of the lid to the cooking pot cannot be assured, when being carried the cooking pot within the heat insulating vessel shifts easily and the food contained therein spills easily. Moreover, food which has spilled over from the cooking pot into the heat insulating container could spill out from the heat insulating container, presenting a hazard.

A heat insulating cooking apparatus as shown in FIG. 13 is available as a conventional cooking apparatus applicable to this type of cooking. This heating insulating cooking vessel consists of a lid 4 releasably provide to the container 3. The container 3 is closed and sealed with the lid 4 and, moreover, an inner pot 2 is releasably contained in the container 3.

The container 3 consists of an inner bottle 5, which is cylindrical and has a curved bottom, and an outer bottle 6, which has a larger diameter than that of the inner bottle 5 and has approximately the same shape as the inner bottle 5, both bottles being joined airtight at their respective upper edges to form a dual wall structure. The space between the inner bottle 5 and the outer bottle 6 is either a vacuum space or is filled with heat insulating material to form a heat insulating portion 7. A bottom element 8 is disposed on the lower face of the container 3, and container handles 9,9 are attached at both sides of the container 3.

The lid 4 consists of an upper lid element 11 of an approximate disc shape and having a lid handle 10 at its center, and with a lower lid element 12 also of an approximate disc shape, the lower lid element 12 being formed in a unitary fashion with the upper lid element 11. The space between the upper lid element 11 and the lower lid element 12 is filled with heat insulating material.

Next an explanation will be given of the inner pot 2 contained in the heat insulating container 1 with reference being made to FIG. 14. The inner pot 2 consists of an inner pot container 13, an inner pot lid 14 and a grip handle 15. The disk shaped inner pot lid 14, which has a diameter approximately equal to that of the mouth portion of the inner container 13, is placed over the mouth portion of the inner pot container 13 in a freely releasable fashion. Further, both ends of semi-circular arc shaped grip handle 15, which has a diameter approximately equal to that of the mouth portion of inner pot container 13, are attached to stopper portions 16,16, which are provided opposite each other on the outer peripheral wall of inner pot container 13, so that the grip handle 15 can be freely raised or lowered.

In a heat insulating vessel of the aforementioned structure, food contents are placed in the inner container 13, the inner pot lid 14 is closed and inner pot 2 is contained entirely within container 3. By closing the mouth portion of the container 3 with lid 4, the temperature of the contents in inner pot 2 can be maintained over a long period of time, thus obtaining a completely cooked product.

However, conventional heat insulating cooking vessels have the following problems. Namely, because inner pot 2 is placed on the inner face of the bottom of the heat insulating container 1 and a part of the bottom edge of inner pot container 13 is maintained in a state wherein it comes in contact with the edge of the inner face of the bottom of the heat insulating container 1, if the dimensions of the inner bottom surface of the heat insulating container 1 are not highly accurate, i.e., the inner bottom surface of heat insulating container 1 is somewhat distorted or is irregular, then the storage of inner pot 2 in heat insulating container 1 is not stable. Accordingly, in the case where heated food is place in inner pot 2 and hereafter contained in heat insulating container 1, when handling the heat insulating cooking vessel, there is the chance that inner pot 2 will shift or tilt, allowing the contents contained therein to spill out.

Further, due to the impact when the inner pot 2 is placed inside heat insulating container 1, or the vibrations which occur when handling the heat insulating cooking vessel, the contact areas between the bottom edge of the outer surface of the inner pot container 13 and the bottom edge of inner surface of the heat insulating container 1 strike against one another, dents or marks arise in this contact area and in the surrounding vicinity.

Further, because the bottom edge of the outer surface of inner pot container 13 and the bottom edge of the inner surface of the heat insulating container 1 come in contact with one another, heat is easily transmitted from inner pot 2 to the heat insulating container 1, or from the heat insulating container 1 to the inner pot 2 via this contact area, this being problematic in that it gives rise to a reduction in the ability to maintain the temperature.

SUMMARY OF THE INVENTION

It is therefore the object of the present invention to provide a superior heat insulating cooking vessel which is convenient to carry and easy to use, which has a high heat insulating ability and which will not permit the contents contained therein to spill out easily even if the vessel is mistakenly dropped or overturned.

Further, the present invention has as an additional object the provision of a heat insulating cooking vessel wherein there is no denting or marking of the inner bottom of the heat insulating container itself, the heat insulating ability is superior, and wherein the heat insulating cooking vessel is convenient to carry and does not permit the contents contained therein to spill out easily.

In a heat insulating cooking vessel wherein a cooking pot with a lid element is contained in a freely removeable fashion within the inner space of a heat insulating container consisting of a heat insulating container member and a lid which closes the mouth portion of this container member, the present invention comprises attachment shafts which are formed projecting outward from both side walls of the container member of the heat insulating container; a grip handle which is attached to the container member via the aforesaid attachment shafts and can be freely raised or lowered; a locking piece which is formed projecting outward from the side of the lid which is positioned above the attachment shafts when the container member is covered by the lid; a concave interlocking portion, which covers the locking piece when the container member is covered with the lid, and which is formed to the attachment parts of the handle grip attached to the sides of the container member; openings formed in the attachment parts of the aforesaid grip handle, the openings communicating with the aforesaid interlocking portion and permitting free movement of the lock in the upward direction when the aforesaid grip handle is lowered on one side of the container member; and a bearing face which presses the locking piece down on the lid and presses the lid down on the mouth portion of the container member when the aforesaid grip handle is in the upright position or is lowered on the other side of the container member.

Due to the above described structure, because the pressing force of the locking piece at the interlocking portion of the handle grip can be released by changing the position of the handle grip, the locking and unlocking of the container member of the heat insulating container with the lid can be carried out.

Further, in one preferred embodiment of the aforesaid heat insulating cooking vessel of the present invention, the container member consists of metallic inner and outer bottles, between which a space is formed. The edges of the openings of both the inner bottle and the outer bottle are joined in a unitary fashion to form the container member. The space formed between the inner bottle and the outer bottle is evacuated to form a heat insulating layer.

By means of the provision of a vacuum heat insulating layer, a container member having superior heat insulating ability can be formed from the inner bottle and the outer bottle.

In another preferred embodiment of the aforesaid heat insulating cooking vessel of the present invention, there is provided to the lower face of the lid, a bearing means for pressing the lid member of the cooking pot which is contained in the container member on to the mouth portion of the cooking pot when the container member is closed with the lid.

According to this construction, because, due to the locking of the lid on to the container member, the lid of the container member presses the lid member of the cooking pot on to the cooking pot, the cooking pot can be sealed. Additionally, because the cooking pot can be held fixed within the heat insulating container, the cooking pot does not move about during transport and the contents contained therein do no easily spill out.

In another preferred embodiment of the aforesaid heat insulating cooking vessel of the present invention, a concavity is formed in the center of the bottom surface of the lid, a knob which is inserted into this concavity is formed in the center of the upper surface of the lid member of the cooking pot, and a bearing means wherein the aforesaid concavity applies pressing force to the lid via the aforesaid knob, is provided. Thus, by means of the locking of the lid with the container member, it is possible to apply pressing force to the lid member of the cooking pot via the concavity and the knob with assurance and to assure the closing and sealing of the cooking pot within the container member.

In another preferred embodiment of the aforesaid heat insulating cooking vessel of the present invention, the lid is attached in a freely moving fashion to the opening of the container member via a hinge connecting device, thus making the opening and closing of the lid simple.

In another preferred embodiment of the aforesaid heat insulating cooking vessel of the present invention, a projecting piece for use in drip prevention is formed at a portion of the lower surface of the lid on the hinge connecting device side thereof.

According to this construction, because the projecting piece prevents dripping when the lid of the heat insulating container is opened and the lower face of the lid is lifted upward, it is possible to prevent droplets from dripping off the lid.

In a heat insulating cooking vessel wherein a cooking pot with a lid element is contained in a freely removeable fashion within the inner space of a heat insulating container consisting of a heat insulating container member and a lid which closes the mouth portion of this container member, the present invention comprises attachment shafts which are formed projecting outward from both side walls of the container member of the heat insulating container; a grip handle which is attached to the container member via the aforesaid attachment shafts and can be freely raised or lowered; a locking piece which is formed projecting outward from the side of the lid which is positioned above the attachment shafts when the container member is covered by the lid; a concave interlocking portion, which covers the locking piece when the container member is covered with the lid, and which is formed to the attachment parts of the handle grip attached to the sides of the container member; openings formed in the attachment parts of the aforesaid grip handle, the openings communicating with the aforesaid interlocking portion and permitting free movement of the lock in the upward direction when the aforesaid grip handle is lowered on one side of the container member; and a bearing face which presses the locking piece down on the lid and presses the lid down on the mouth portion of the container member when the aforesaid grip handle is in the upright position or is lowered on the other side of the container member; wherein a handle consisting of a grip handle hilt part extending in the upper direction of the cooking pot, a grip handle extending part provided to the grip handle hilt part and extending away from the cooking pot, and a knob part attached to the tip of the grip handle extending part, is formed to the side wall of the cooking part; and further wherein, the grip handle extending part is formed at a position at which the grip handle extending part contacts with the upper edge of the mouth portion of the container member and hangs down without contacting with the bottom of the container member, when the cooking pot is contained within the container member.

Due to the above construction, the storage of the cooking pot in the container member made stable and, for example, such inconveniences as the cooking pot rattling or tilting when handling the heat insulating cooking pot in which the cooking pot has been contained within the container member, are eliminated.

Further, because there is a space is provided therebetween, the outer surface of the cooking pot and the inner surface of the container vessel do not strike against one another due to the impact at time of placing the cooking pot in the container member, the vibrations caused during handling of the heat insulating cooking vessel, or the like. Thus, the dents and marks which are caused by the striking together of the outer surface of the cooking pot and the inner surface of the container member are prevented.

Because there is a space provided between the outer surface of the cooking pot and the inner surface of the container member and thus they do not come in contact with each other, the only heat transmission which occurs from the outer surface of the cooking pot to the inner surface of the container member and from the inner surface of the container member to the outer surface of the cooking pot is that which takes place via the vacuum layer, which has a low degree of heat transmissivity. Accordingly, the heat insulating capabilities of the heat insulating cooking vessel is high.

In another preferred embodiment of the aforesaid heat insulating cooking vessel of the present invention, the container member is comprised of a metallic inner bottle and metallic outer bottle, both bottles being joined in a unitary fashion at their respective upper edges, and the upper edge of the opening of the container member supports the aforesaid handle grip extending portion.

In another preferred embodiment of the aforesaid heat insulating cooking vessel of the present invention, a means to control the position of the cooking pot in a non-contact state with the inner surface of the container member by supporting the tip of the grip handle extending portion is formed to an outer container handle.

In another preferred embodiment of the aforesaid heat insulating cooking vessel of the present invention, a bearing face for preventing contact between the external side surface of the cooking pot and the inner side surface of the container member by controlling the position of the tip of the grip handle extending portion is formed to the outer container handle. As a result, because the external side surface of the cooking pot does not come in contact with the inner side surface of the container member, there is not heat transmission from the cooking pot to the container member nor from the container member to the cooking pot. Accordingly, the heat retaining capabilities are improved.

In another preferred embodiment of the aforesaid heat insulating cooking vessel of the present invention, there is provided to the lower surface of the lid a bearing means for pressing the lid member of a cooking pot which has been contained in the container member on to the mouth portion of the cooking pot when the container member is closed by the lid.

According to this construction, because, by locking the lid of the container member, the lid of the container member presses the lid member of the cooking pot down on to the cooking pot, the cooking pot is sealed and, at the same time, the cooking pot is set firmly in the heat insulating container. Thus, there is no movement of the cooking pot during and the contents of the cooking pot do not easily spill out during transport.

In another preferred embodiment of the aforesaid heat insulating cooking vessel of the present invention, a concavity formed in the center of the lower surface of the lid, a knob which is inserted into the concavity formed in the center of the upper surface of the lid member of the cooking pot, and a bearing means wherein the aforementioned concavity presses down on the lid member via the aforementioned knob. Thus, by means of the locking of the lid of the container member, pressing force can be applied to the lid member of the cooking pot with assurance via the concavity and the knob, making possible the reliable sealing of the cooking pot within the container member.

BRIEF DESCRIPTION OF THE DRAWINGS

FIG. 5 is a cross sectional diagram of a part of the grip handle attachment part showing the condition when the lid has been opened by releasing the lock between the lid and the container member of the heat insulating cooking vessel shown in FIG. 1.

FIG. 6 is a cross sectional diagram of a part of the grip handle attachment part showing another condition of the locking state between the lid and the container member of the heat insulating cooking vessel shown in FIG. 1.

DETAILED DESCRIPTION OF THE INVENTION

A concrete explanation of the heat insulating cooking vessel of the present invention will be explained below using the preferred embodiments.

Figure 1:
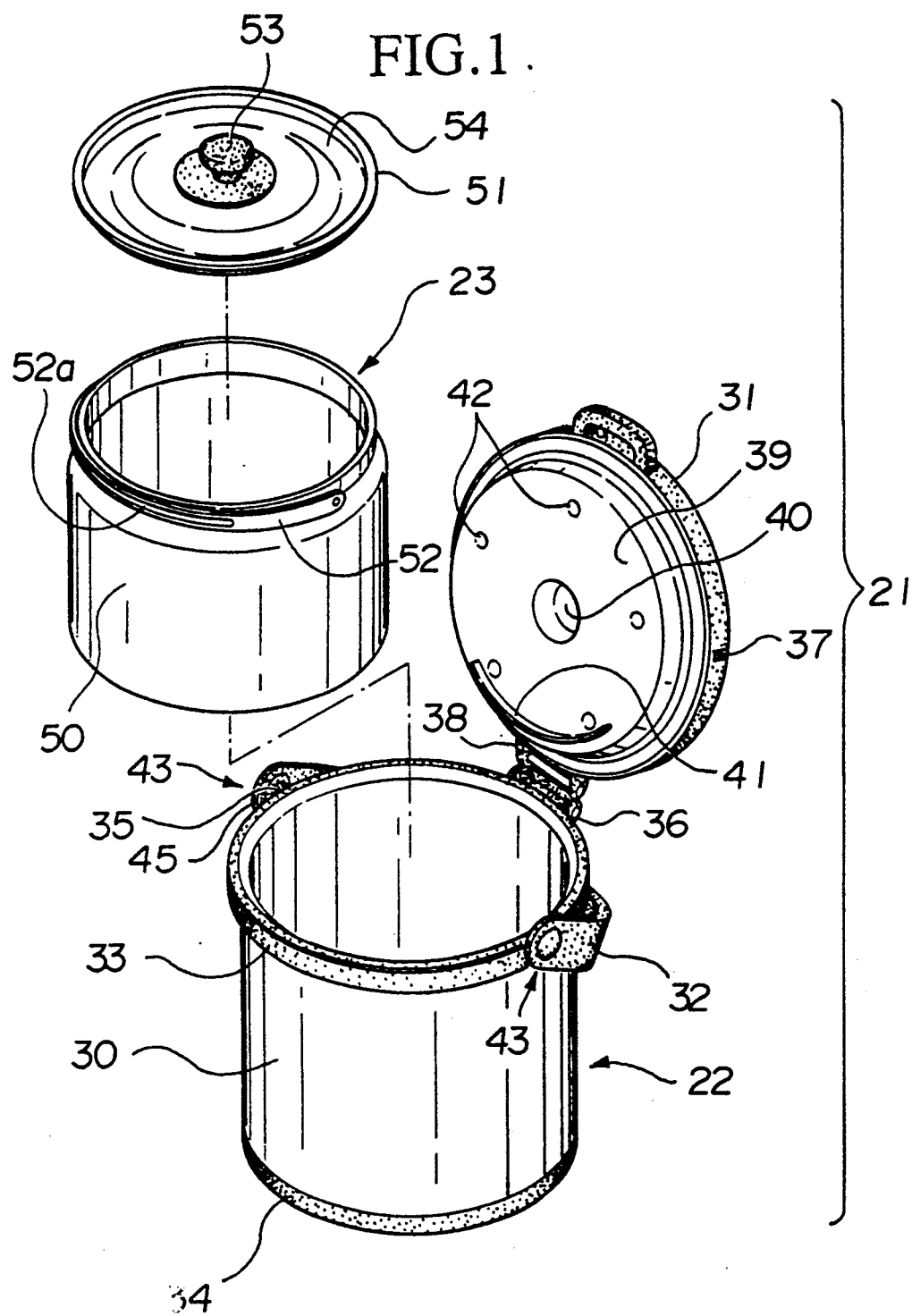
FIG. 1 is a perspective view of one embodiment of the present invention showing the component parts of the heat insulating cooking vessel.
Figure 2:
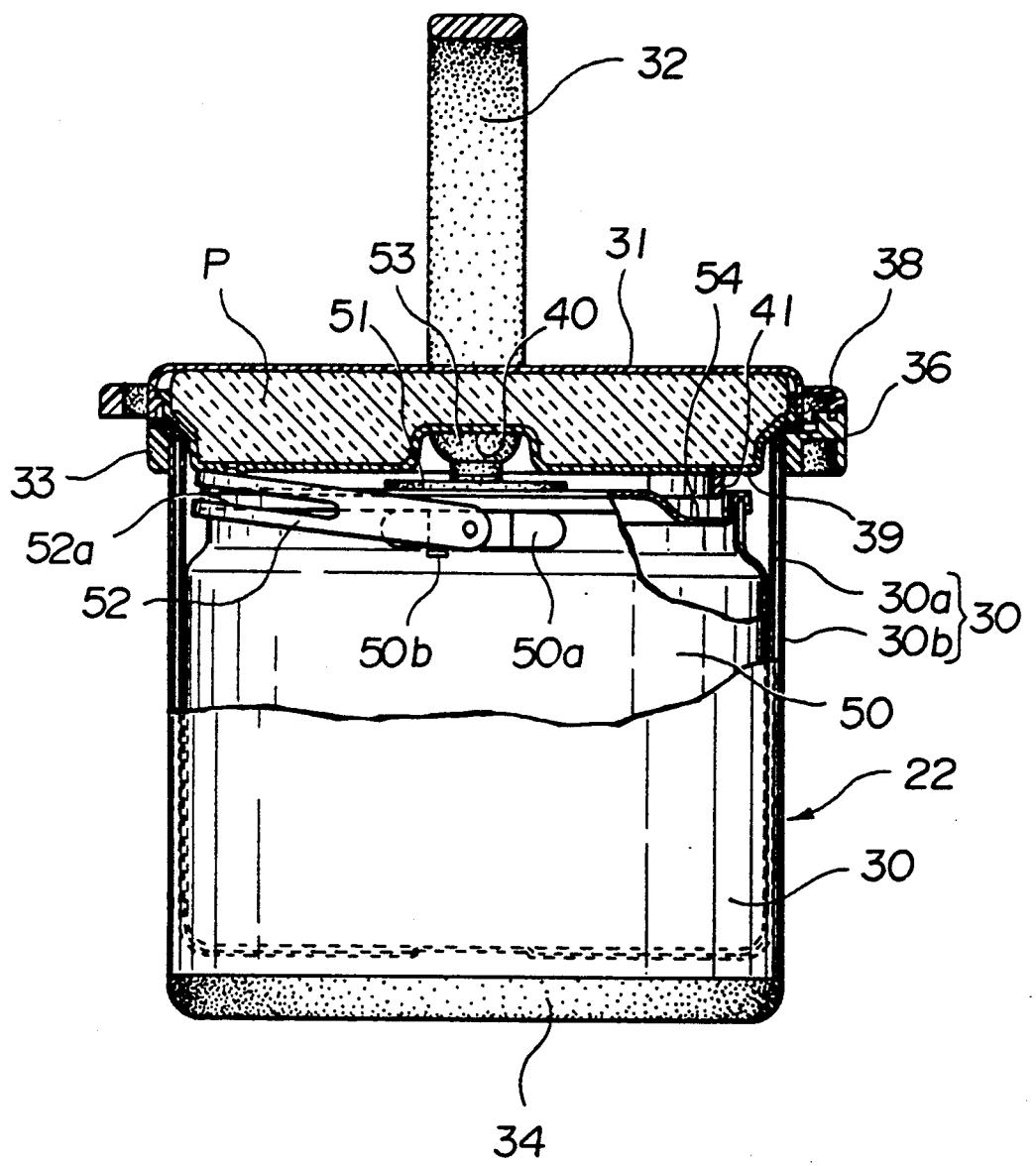
FIG. 2 is a cross sectional side view taken along a part of the heat insulating cooking vessel shown in FIG. 1.

FIGS. 1 and 2 are diagrams showing the overall structure of the first embodiment of the heat insulating cooking vessel of the present invention. The heat insulating cooking vessel 21 in this example consists of a heat insulating container 22 and a cooking pot 23 which is housed releasably in the heat insulating container 22.

Heat insulating container 22 consists of a cylindrical container member 30 comprising a stainless steel evacuated heat insulating container; a lid 31 which is made from a synthetic resin and contains a heat insulating layer P as shown in FIG. 2, lid 31 being attached to the container member 30 to cover the opening thereof and so as to be freely releasable therefrom; and a grip handle 32 which is made from a synthetic resin and is attached at opposing sides of the container member 30 and which can be freely lowered or raised. As is shown in FIG. 2, the aforesaid container member 30 comprises a metallic inner bottle 30a and a metallic outer bottle 30b, an open space being formed therebetween, the mouth portions of metallic inner bottle 30a and metallic outer bottle 30b respectively being joined together to form a unitary structure. The space between inner bottle 30a and outer bottle 30b is either a vacuum space or is filled with heat insulating material to form a heat insulating layer.

A mouth edge part 33 and a bottom protecting cover 34, both comprised of synthetic resin, are formed so as to enclose, respectively, the peripheries of the external wall of the mouth portion of the container member 30 and the external surface of the bottom of the container member 30. As is shown in enlarged view in FIGS. 3 and 4, attachment shafts 35,35, for attaching the grip handles, are formed at opposing positions on the side wall of mouth edge part 33, and are formed in a unitary fashion with and projecting out from the mouth edge part 33. Further, at the external periphery of the mouth edge part 33 shown in FIG. 1, a female hinge fastener 36 for attachment of the lid 31 is provided in a unitary fashion with mouth edge part 33 to a portion of one of either of the attachment shafts 35,35.

To both sides of the aforesaid lid 31, respectively projecting locking pieces 37 are formed at positions corresponding to the positions of attachment shafts 35,35 when container member 30 is closed with the lid 31. A male hinge fastener 38 is formed at a position at the side of the lid 31 which corresponds to the position of the aforesaid hinge fastener 36. Lid 31 is provided to container member 30 in a freely opening and closing fashion by the mutual connection of the hinge fastener 36 and the hinge fastener 38.

As may be seen from the cross sectional structure shown in FIG. 2, lid 31 has an obulate disk shape consisting of a top plate and peripheral plates. An inner surface lid 39 is attached to the bottom of lid 31, forming a hollow space therebetween. This hollow space is filled with a heat insulating layer P made of a synthetic resin.

Concavity 40 is formed in the center of the bottom surface of the inner surface lid 39. This concavity 40 is formed of a size such that it can contain knob 53 which is provided to lid member 51 of the cooking pot 23 which will be explained below. The inner surface lid 39, in which concavity 40 is formed, possesses elasticity because the inner surface lid 39 and the insulating layer P are formed of a synthetic resin, and is constructed so that, when lid 31 is closed, inner surface lid 39 comes in contact with knob 53, applying bearing force on knob 53 to press it down on the mouth portion of cooking pot 23, making it possible to firmly set the lid member 51 of the cooking pot 23 on the cooking pot 23. Moreover, if the aforementioned knob 53 is formed of an elastic material, then the pressure sealing effects of lid member 51 from the bearing force become even greater.

Further, a projecting piece 41 in the shape of a curved arc is formed to the inner surface lid 39 and is located on the side of inner surface lid 39 which corresponds to the side of the lid 31 at which the hinge fastener 38 is formed. This projecting piece 41 is provided for resting lid member 51 thereon when the lid member 51 is removed from the cooking pot 23. Further, a plurality of protrusions 42 are provided to the inner surface lid 39.

Figure 3:
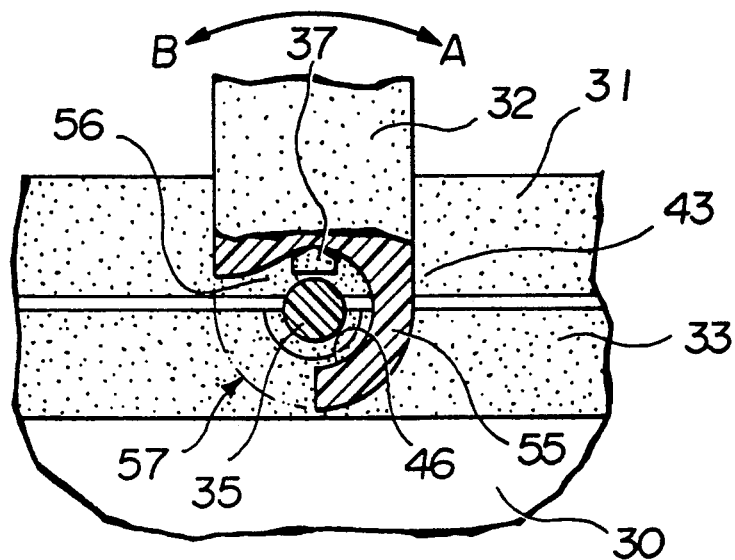
FIG. 3 is a cross sectional view of a portion of the grip handle attachment part showing the condition when the lid and the container member of the heat insulating cooking vessel shown in FIG. 1 are locked.
Figure 4:
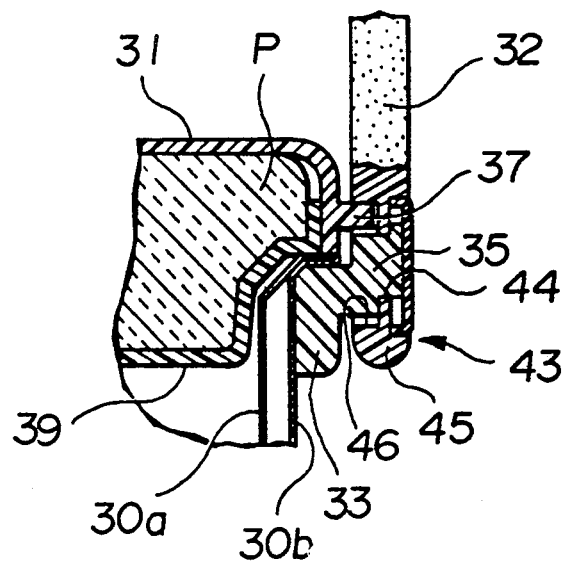
FIG. 4 is a cross sectional diagram along the line IV—IV in the grip handle attachment part of the heat insulating cooking vessel shown in FIG. 3.
Figure 7:
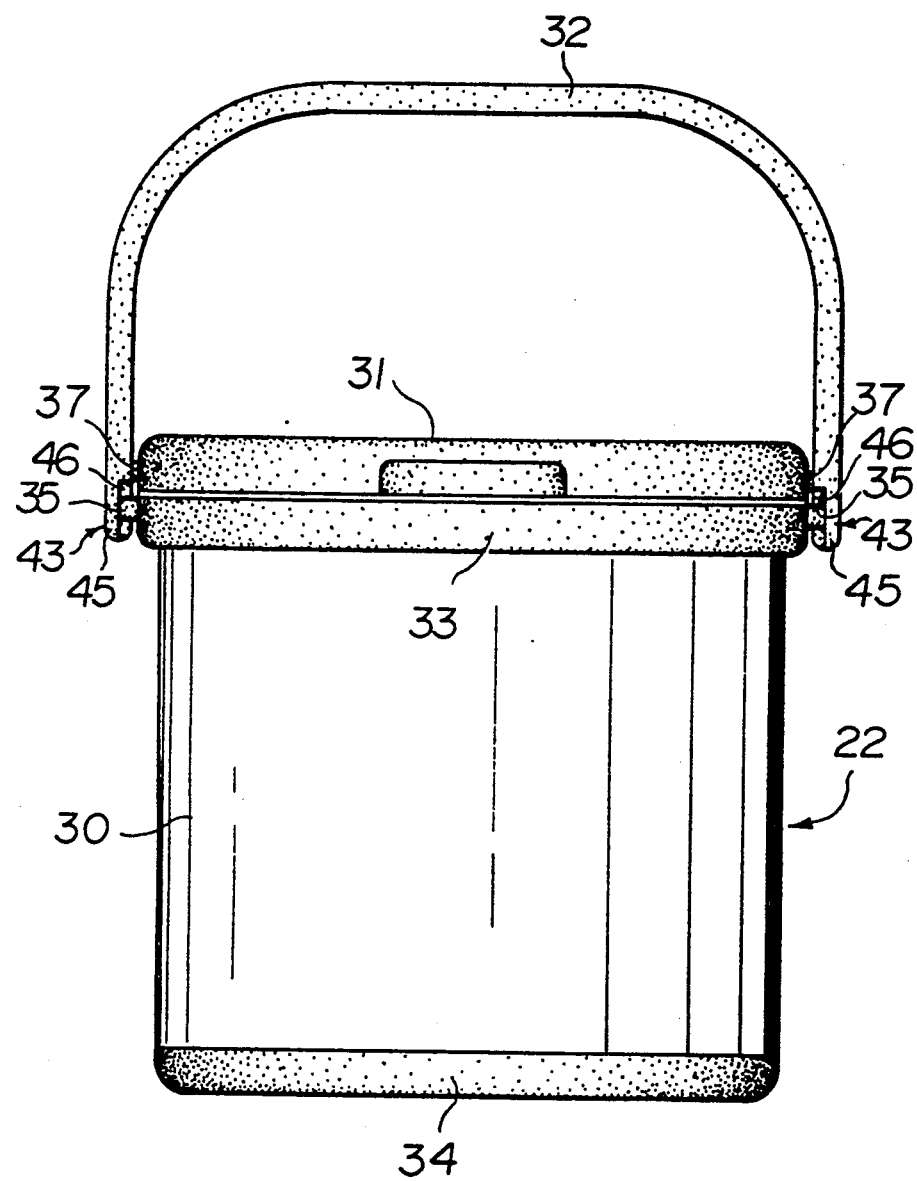
FIG. 7 is a side view of the heat insulating cooking device shown in FIG. 1.

The aforesaid grip handle 32 has an arched shape, and attachment parts 43,43 in the approximate shape of a disk are formed at both ends of grip handle 32. As is shown in FIG. 4, attachment holes 44 are formed in the center of the approximate disk shaped portion of attachment parts 43,43. By inserting an attachment shaft 35 into an attachment hole 44, grip handle 32 is attached to the container member 30 in a manner so as to make possible the free raising or lowering of the grip handle 32. In other words, grip handle 32 is provided so that it can be freely raised or lowered, with the direction of the raising and lowering movement being from the front to the back or from the back to the front of the container member 30, with the attachment shafts 35,35 being used as fulcrum points. Further, as is shown in FIG. 3, an extending wall 55, which projects outward and extends from the end of grip handle 32 and across approximately half of the circumference thereof, is formed to the outer periphery of attachment 43 so as to be positioned on the right side of the grip handle 32 in this figure (on the hinge fastener 36 side in FIG. 1). To the inner side of extending wall 55 there is provided a concave shaped engaging part 56 which is formed from the end of grip handle 32 and the extending wall 55. The inner surface of the engaging part 56 is employed for a bearing face 46 which engages with the upper surface of the aforesaid locking pieces 37. Further, an open portion 57 is formed at the side of the end of the extending wall 55, this open portion opening one side of the end of grip handle 32. Open portion 57 communicates with the aforesaid concave shaped engaging part 56.

The cooking pot 23 has a three layer construction wherein a steel plate such as carbon steel which has good thermoconductivity is layered between stainless steel plates or the like. Cooking pot 23 comprises a pot member 50; a freely detachable lid member 51, formed from stainless steel, which covers the mouth portion of the pot member 50; and an arched grip handle 52 which is attached at opposing sides of the pot member 50 so that it can be freely raised or lowered.

Lid member 51 is disk shaped, and knob 53 made of a synthetic resin, is formed to project outward from the center of the upper surface of lid member 51. At the same, a step portion 54 for insertion into the rim of the opening at the upper portion of the pot member 50 is formed to the outer periphery of the upper surface of lid member 51.

Grip handle 52 is attached by a hinge fastening so that it can be freely raised and lowered with respect to the plate shaped attachment parts 50a,50a shown in FIG. 2 which are attached at increments of 180° at the peripheral edge of the mouth portion of the pot member 50. A stoppers 50b is formed to one side of each of these attachments 50a,50a and projecting therefrom. One of the attachment parts 50a is attached to the pot member 50 so that the stopper 50b formed to this attachment part 50a stops the movement of the grip handle 52 in the descending direction, while the other attachment part 50a is attached to the pot member 50 so that the stopper 50b formed to this other attachment part 50a stops the movement of the grip handle 52 in the ascending direction.

Because of the contact with stoppers 50b,50b, when lowered, grip handle 52 is positioned at a position slightly higher than the edge of the pot member 50, and conversely, when raised, grip handle 52 is placed in an upright position. Further, a slit 52a for quickly cooling grip handle 52 is formed in center of the grip handle 52.

Next, an explanation will be made of the employment of a heat insulating cooking vessel 21 of the above construction.

In the utilization of the aforementioned heat insulating cooking vessel 21, once the cooking materials have been preheated in the cooking pot 23 and other preliminary preparations have been completed, lid 31 is opened and cooking pot 23 is contained within heat insulating container 22. Next, the heat insulating container 22 is closed with lid 31 and grip handle 32 is moved to the open side of lid 31 (to the left in FIG. 1, and in the direction of the arrow B in FIG. 3). As a result, the bearing face 46 of the engaging part 56 of the grip handle 32 engages with the upper surface of the locking piece 37, sealing container member 30 and lid 31, while at the same time, the concavity 40 formed in the inner surface lid 39 which is on lower surface of lid 31 bears down on the knob 53 of the cooking pot 23. As a result, lid member 51 is pressed down and firmly set over the mouth portion of the pot member 50.

Further, when transporting heat insulating cooking vessel 21 by raising the grip handle 32, because the attachment part of the grip handle 32 is in the state as shown in FIG. 3, bearing face 46 engages with the upper surface of the locking piece 37 and presses locking piece 37 down, lid member 51 is firmly set on the edge of the opening of the pot member 50 by the bearing force of concave part 40 on the knob 53 of the cooking pot 23. Thus, the contents do not spill out from the cooking pot 23 during transport.

Further, if grip handle 32 is lowered to the open side of lid 31, i.e. the state as shown in FIG. 6, then, even if the heat insulating cooking vessel 21 is transported by car, etc, the contents therein do not spill out because lid member 51 is set firmly on the pot member 50 and, at the same time, the cooking pot 23 is set firmly within the heat insulating container 22. Further, even if the heat insulating cooking vessel 21 is accidentally dropped or overturned, there is no danger of the contents spilling out from the heat insulating container 21.

When serving the contents within the heat insulating cooking vessel 21 following completion of cooking, grip handle 32 is lowered to the side of container member 30 at which hinge fastener 36 is located (the direction shown in FIG. 3), and the engagement between the locking piece 37 and the engaging part 56 is released as shown in FIG. 5. Then, because open portion 57 of a side of the tip of the grip handle 32 is positioned in the upward direction as shown in FIG. 5, locking piece 37 can move freely in the upward direction. As a result, it becomes possible to open lid 31, and remove the contents from the cooking pot 23.

When serving the contents of cooking pot 23, the lid member 51 of the cooking pot 23 can be rested on the projecting piece 41 of the lid 31 which has been placed in an upright position. Further, because there are a plurality of protrusions 42 provided to the inner surface lid 39, lid member 51 comes in contact with the protrusions 42 but does not directly contact with the inner surface lid 39, therefore, there is little concern that the inner surface lid 39 will be dirtied by the food contents or droplets of moisture. Further, when lid 31 is raised and lid member 51 is placed on projecting piece 41 so as to lay along the inner surface lid 39, the droplets formed on the lower surface of the inner surface lid 39 or on the inner surface of the lid member 51 roll down along the inner surface lid 39 or the lid member 51 and, as a result, can be collected in the projecting piece 41 and prevented from dripping off lid 31.

Further, when serving the contents of the cooking pot 23 following the removal of the cooking pot 23 from heat insulating container 22, as shown in FIG. 1, because the grip handle 52 of the cooking pot 23 is stopped at a position slightly higher than the edge of the pot member 50, grip handle 52 can be easily raised by inserting a finger into slit 52a and, thus, the cooking pot 23 can be easily removed from the heat insulating container 22.

In the preceding preferred embodiment of the present invention, the structure of the present invention was one wherein lid 31 of the heat insulating container 22 and the heat insulating layer P provided to the lid 31 are formed of a synthetic resin, and wherein the elastic concavity 40 formed in lid 31 comes in contact with the knob 53 which is provided to the lid member 51 of the cooking pot 50. However, provided that the structure provided is one in which, when lid 31 of heat insulating vessel 22 is closed, pressing force is applied to lid member 53 of cooking pot 23, setting the lid member 53 firmly on the pot member 50 of the cooking pot 23, then the preceding embodiment is not limited to any particular shape or material. For example, a convexity may be provided to the lid 31 of the heat insulating container 22, and bearing pressure may be applied to the lid member 51 of the cooking pot 23 by this concavity. Further, a structure is also possible wherein neither a concavity nor a convexity is formed in the lower surface of the lid 31, but instead bearing force is applied to the knob 53 by the lower surface of the lid 31.

An explanation of a second embodiment of the heat insulating cooking container according to the present invention will now be explained using on FIGS. 8 through 12.

Figure 8:
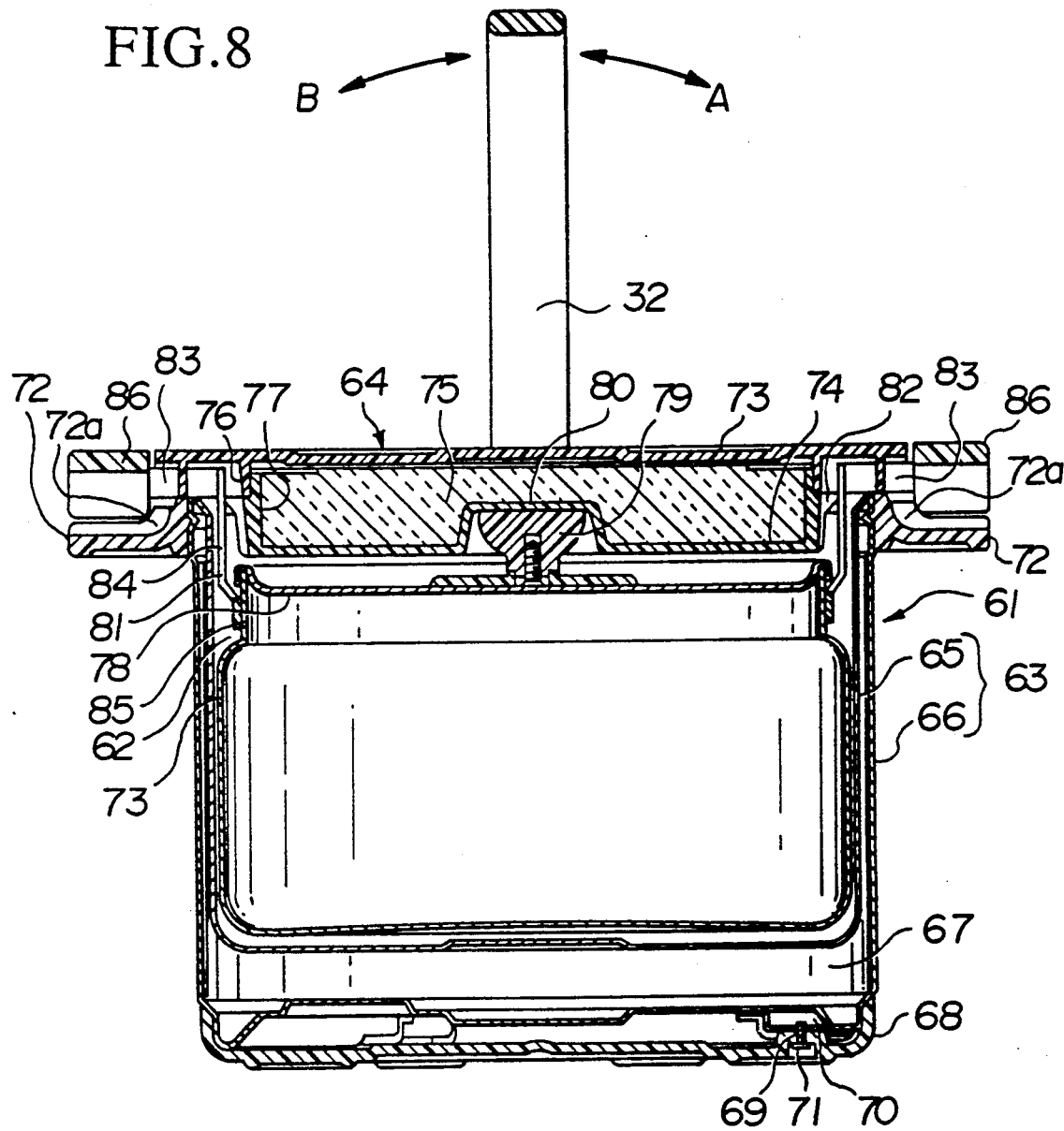
FIG. 8 is a cross sectional view of the heat insulating cooking vessel showing another embodiment of the present invention.
Figure 9:
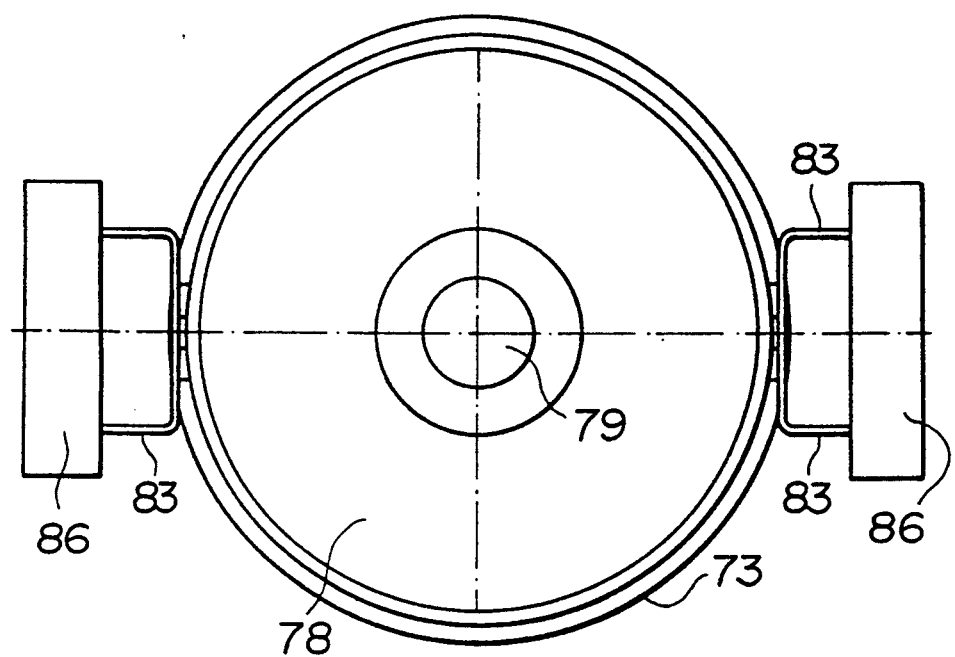
FIG. 9 is a plane view showing the cooking pot of the heat insulating cooking vessel shown in FIG. 8.
Figure 10:
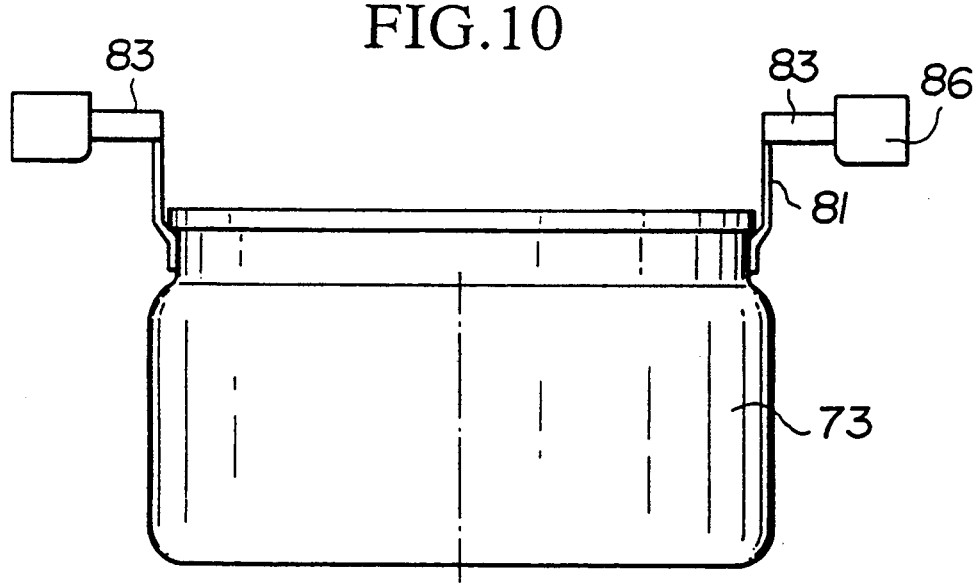
FIG. 10 is a side view of the heat insulating cooking vessel shown in FIG. 8.

Shown in FIG. 8, the heat insulating cooking vessel of the second embodiment of the present invention comprises a heat insulating container 61, and a cooking pot 62, which is contained within heat insulating container 61 so as to be freely insertable thereinto and removable therefrom. In this heat insulating container 61, a lid 64 is attached to the container member 63 so as to be freely opening and closing. Further, unlike the lid 31 in the preceding embodiment, the lid 64 of this embodiment does not specifically have a hinge connecting part. When closing container member 63, lid 64 is covered by container member 63; however, when opening container member 63, lid 64 is removed from the container member 63.

The aforementioned container member 63 is composed of a cylindrical inner bottle 65 made of stainless steel or carbon steel and a cylindrical outer bottle 66 made of the same material as that of the inner bottle 65 and having a diameter larger than that of the inner bottle 65. The inner bottle 65 and the outer bottle 66 form a dual wall structure with the respective upper edges of the bottles being joined in an airtight manner. A heat insulating portion 67 consisting of a vacuum or filled with insulating material is formed in the space between the inner bottle 65 and the outer bottle 66.

A bottom member 68 is attached to the lower surface of the container member 63 by screwing a screw 71 into a screw hole 69 drilled in the bottom member 68 and a screw receiver 70 provided in the outer bottle 66. Further, to the outer periphery of the mouth portion of the container member 63, there is the mouth edge part 33 of the same structure as the mouth edge part 33 of the container member 30 of the first embodiment explained above. Outer container handles 72,72 for supporting heat insulating container 61 are attached to the mouth edge part 33 of the container member 63 at a 180° intervals from each other about the mouth edge part.

Figure 11:
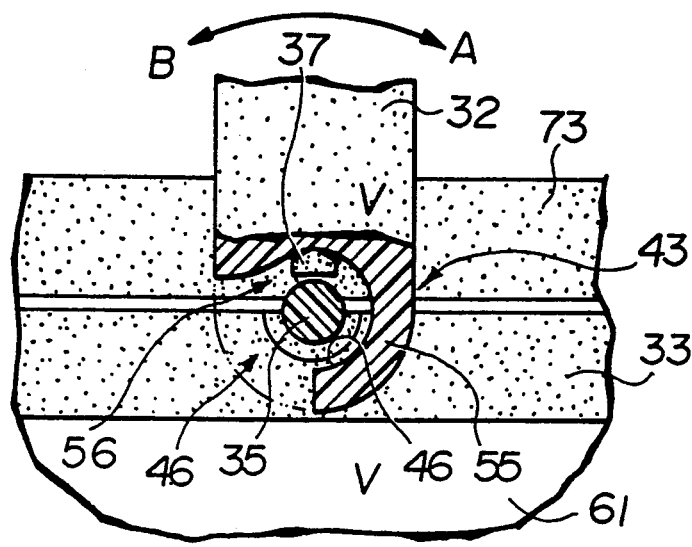
FIG. 11 is a cross sectional view of a part of the grip handle attachment part shown in the condition when the lid and the container member of the heat insulating cooking vessel shown in FIG. 8 are locked.
Figure 12:
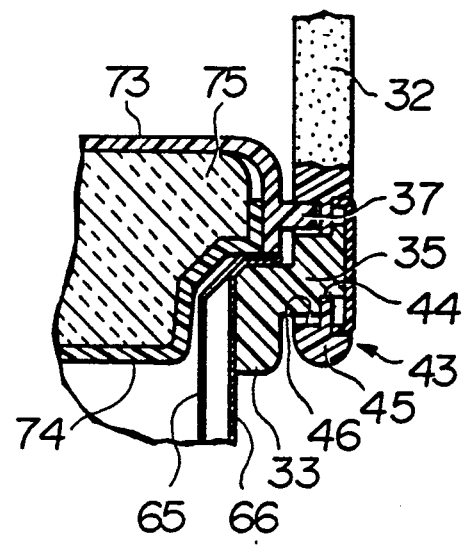
FIG. 12 is a cross sectional diagram along the line V—V in the grip handle attachment part of the heat insulating cooking vessel shown in FIG. 11.
Figure 13:
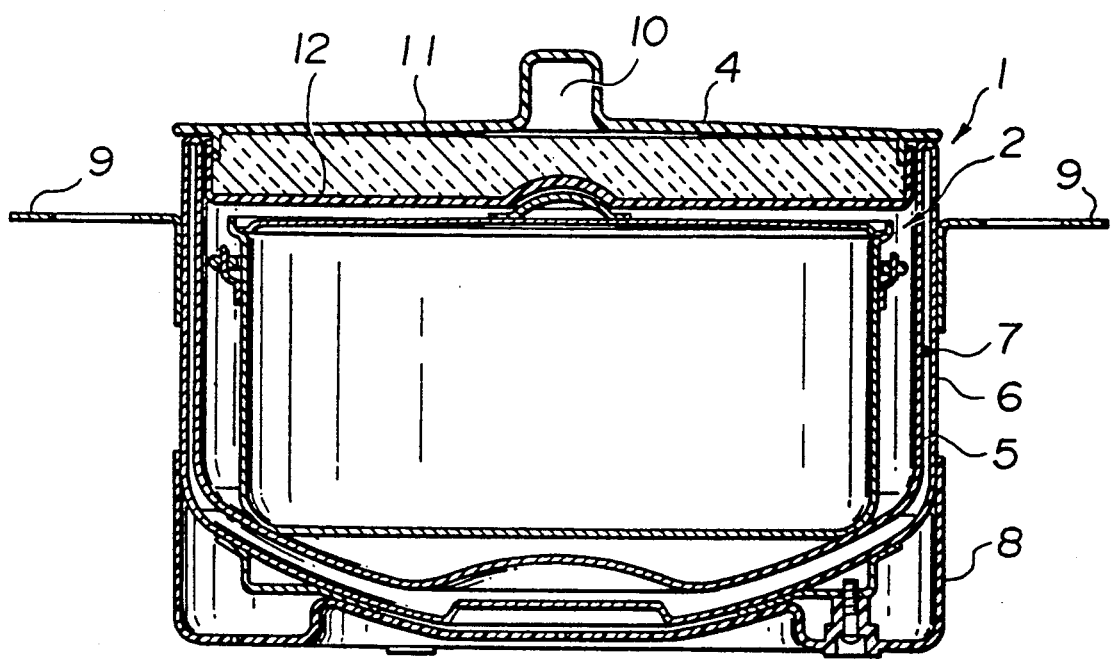
FIG. 13 is a cross sectional diagram showing an example of a conventional heat insulating cooking vessel.
Figure 14:
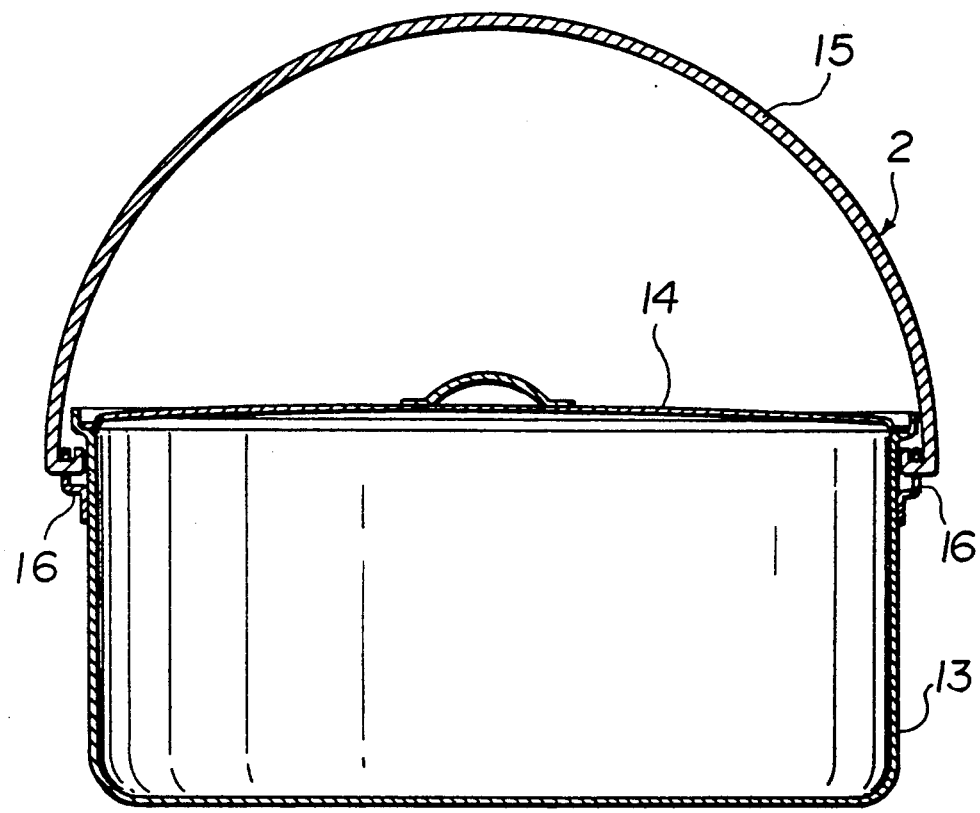
FIG. 14 is a cross sectional diagram showing the inner pot of the heat insulating cooking vessel shown in FIG. 11.

Additionally, as the container grip handle employed in this embodiment, the grip handle 32 used in the structure of the first embodiment described above is provided here as well. This container grip handle 32 is provided so that it can be raised or lowered, passing over the outer container handles 72,72, to be placed in an upright or lowered position. Further, the structure of the attachment part of the grip handle 32 in this example is identical to that in the above first embodiment. Namely, a locking piece 37 identical in structure to that in the first embodiment is formed to the side of lid 64, and the same construction wherein pressing force is brought to bear on lid 64 by the application of pressing force to the locking piece 37 by the bearing face 46 of the attachment portion of the grip handle 32 is employed in this embodiment. Moreover, as the structure of these parts was already explained in the preceding embodiment, the essential parts thereof are shown in FIGS. 11 and 12 and a detailed explanation is omitted here.

As shown in FIG. 8, the lid 64 of the second embodiment of the present invention is a disk shaped plate consisting of a top plate and side wall plates. An inner surface lid 74, approximately disk shaped, is affixed to the lower surface of the lid 64, and the space therebetween is filled with a heat insulating material 75. Lid 64 and inner surface lid 74 are connected by the engagement of an upper engaging member lower engaging member 77, which is formed projecting downward from the vicinity of the outer periphery of lid 64, and a lower engaging member 77, which is formed projecting from the vicinity of the outer periphery of the inner surface lid 74. Further, a concavity 80 for housing a knob 79 attached to lid member 78 of the cooking pot 62 is formed to the center of the lower surface of the inner surface lid 74.

Lid 64 is formed so that, when cooking pot 62 is contained in container member 63 and the lid 64 is closed, the lower surface of the inner surface lid 74 is positioned slightly lower than the upper surface of the container member 63. Further, cutouts 82 through which a grip handle extending portion 83, to be explained below, is passed so as to extend outside the container member 63 is formed to the side wall of the lid 64.

Cooking pot 62 consists of summarily of a pot member 73, a lid member 78, and a pot grip handle 84. A disk shaped lid member 71 having a diameter approximately the same as the mouth portion 85 of the pot member 73 is placed on the mouth portion 85. Knob 79, consisting of a plastic material or the like which has low heat transmissivity properties, is attached to the center of the lid member 78.

The metallic cooking pot 62 is formed with a bottom and is of a cylindrical shape. The mouth portion 85 thereof is provided with a diameter smaller than that of the other parts. Two pot grip handles 84 are attached at 180° intervals to the outer periphery of the mouth portion 85.

Pot grip handle 84 consists of a tang portion 81 which extends in the upper direction of the cooking pot 62; a handle grip extending portion 83, which is provided to the upper end of the tang portion 81 and extends at a right angle therefrom; and a grip portion 86, which is provided to the end of the grip handle extending portion 83. The lower end of the tang portion 81 is attached to pot member 73 by welding. This tang portion 81 and grip handle extending portion 83 are formed by bending rectangular shaped plates made from stainless steel, and extend higher upward than the mouth portion 85 of the pot member 73. Because the tang portion 81 is exposed to heating when the cooking pot 62 is heated, and must also stand up to impacts, weight, etc., it is formed from heat resistant stainless steel having a high degree of strength.

Grip portion 86 which is attached to the tang portion 81 is formed from a material having a low rate of thermal transmissivity such as wood or thermosetting resin, and is constructed so as not to reach a temperature at which it is too hot to touch with the hand, even when the tang portion 81 and the grip handle extending portion 83 have undergone heating to a temperature at which they are temporarily too hot to be touched with the hand.

When containing the cooking pot 62 in the heat insulating container 61, the aforementioned tang portion 81 passes through the cutouts 82 formed at 180° intervals to the outer periphery of the lid 64 and extends upward from the inner bottle 65 of the container member 63. Grip handle extending portion 83 is disposed at a right angle in the radial outward direction of cooking pot 62 and grip portion 86 is attached to the end thereof. This grip handle extending portion 83 contacts with and is supported by the mouth portions of inner bottle 65 and outer bottle 66. Outer container handle 72 is attached to the outer peripheral surface of the vicinity of the mouth portion of the container member 63. When containing cooking pot 62 in container member 63, the outer surface of cooking pot 62 does not contact with the inner surface of the container member 63, but rather the outer surface of the cooking pot 62 and the inner surface of the container member 63 are maintained with spacing therebetween. Namely, a step portion 72a, on which grip portion 86 of cooking pot 62 is placed, is formed at the upper surface of the outer container handle 72. The position of grip portion 86 is regulated by the step part 72a, and the side surface of the pot member 73 and the inner side surface of the inner bottle 65 do not contact.

Additionally, the provision of the aforementioned outer container handle 72 may be omitted, and the grip handle extending portion 83 may be supported by the upper edge of the mouth portion of the container member 63. As a result, as in the case stated above, when containing the cooking pot 62 in the container member 63, the outer surface of cooking pot 62 does not contact with the inner surface of the container member 63, but rather the outer surface of the cooking pot 62 and the inner surface of the container member 63 are maintained with spacing therebetween.

In this embodiment of the heat insulating cooking vessel of the present invention, the bottom edge of tang portion 81 is attached to the outer peripheral surface of the mouth portion 85 of the cooking pot 62. When containing cooking pot 62 in heating insulating container 61, this grip handle extending portion 83 passes through cutouts 82 formed in the lid 64 and extends upward from the inner bottle 65 of the container member 63. Grip portion 86 is attached to the tip of the grip handle extending portion 83, and grip handle extending portion 83 contacts with and supports outer container handle 72 which is attached to the upper edge of the container member 63. For this reason, when containing cooking pot 62 in container member 63, the outer surface of cooking pot 62 does not contact with the inner surface of the container member 63, but rather the outer surface of the cooking pot 62 and the inner surface of the container member 63 are maintained with spacing therebetween, thus making the containment of the cooking pot 62 in the container member 63 stable.

Accordingly, the problem of the cooked contents of the cooking pot 62 spilling out into the container member 63 when the cooking pot is shook or tilted during handling of a heat insulating cooking vessel, wherein a cooking pot 62 which holds food which has been brought to a cooked state is contained in a container member 63, is resolved.

Further, because an interval of space is provided between the outer surface of the cooking pot 62 and the inner surface of the container member 63, the outer surface of the cooking pot 62 and the inner surface of the container member 63 do not strike against one another as a result of impact when installing the cooking pot 62 in the container member 63, or when vibrations arise during handling of the heat insulating container, etc. Thus, it is possible to prevent the occurrence of dents or marks which result from the striking together of the outer surface of the cooking pot 62 and the inner surface of the container member 63. Accordingly, the durability of the the cooking pot 62 and the container member 63 is improved.

Further, space is provided between the outer surface of the cooking pot 62 and the inner surface of the container member 63 and there is no contact therebetween at all. As a result, with the exception of only that which occurs via the air layer, which has a low degree of heat transmissivity, heat transmission from the outer surface of the cooking pot 62 to the inner surface of the container member 63, or, from the inner surface of the container member 63 to the outer surface of the cooking pot 62 does not take place. Accordingly, the thermal insulating properties of the heat insulating cooking vessel is high, and it is possible to improve the temperature holding efficiency of the heat insulating cooking vessel.

Further, the plate-shaped metallic grip handle extending portion 83 of the cooking pot 62 extends along the radial direction of the cooking pot 62 and lies in the vertical plane. For this reason, even if grip handle extending portion 83 is heated due to hot air rising upward from the outer surface of the cooking pot 62, because the area of the surface receiving the heat is small, the temperature increase in the grip handle extending portion 83 is less than in the case where the handle grip extending portion is temporarily disposed horizontally. Thus, grip portion 86 does not easily become hot and, as a result, this is advantageous when transporting the cooking pot 62.

What is claimed is:

1. A heating insulating cooking vessel including a heat insulating container having a mouth portion, a lid for closing the mouth portion of said heat insulating container, a grip handle attached by attachment parts to the outer surface of the mouth portion of said heat insulating container so as to be freely raisable or lowerable, a cooking pot having a mouth portion and contained releasably in said heat insulating container, and a lid member for closing the mouth portion of said cooking pot, said heat insulating cooking vessel characterized in that:

said insulating container comprises a container member and attachment shafts which are formed to opposing sides of said container member and support said grip handle;

said lid comprises locking piece attached to opposing sides of said lid;

said grip handle is provided at said attachment parts thereof with an open portion which permits the free movement of said locking piece in the upper direction when said grip handle is lowered to one side of said container member, and with a concave shaped engaging part which covers said locking piece when said container member is covered by said lid, said engaging part comprising a bearing face at the inner surface thereof, said bearing face pressing said lid on to the mouth portion of said container member by pressing on said locking piece when said grip handle is placed in the upright position or is lowered to the other side of said container member.

2. A heat insulating cooking vessel according to claim 1 characterized in that said container member consists of a metallic inner bottle and a metallic outer bottle, a space being formed therebetween, the edges of the openings of said inner bottle and said outer bottle being joined in a unitary fashion to form said container member, and the space formed between said inner bottle and said outer bottle forming a vacuum insulating layer.

3. A heat insulating cooking vessel according to claim 1 characterized in that a bearing portion is provided to the inner surface of said lid, said bearing portion pressing said lid member of said cooking pot, which is contained in said container member, on to the mouth portion of said cooking pot when said container member is closed with said lid.

4. A heat insulating cooking vessel according to claim 3 characterized in that a concavity is formed in the center of the lower surface of said lid, and a knob for insertion into said concavity is formed in the center of the upper surface of said lid member of said cooking pot, said concavity and said knob forming a bearing portion wherein said concavity applies pressing force to said lid member via said knob.

5. A heat insulating cooking vessel according to claim 1 characterized in that said lid is attached to the opening of said container member via a hinge attachment so as to be freely opening and closing.

6. A heat insulating cooking vessel according to claim 5 characterized in that a projecting piece for preventing drip run-off is formed to the hinge side of said lid, at a portion of the lower surface thereof.

7. A heating insulating cooking vessel including a heat insulating container having a mouth portion, a lid for closing the mouth portion of said heat insulating container, a grip handle attached by attachment parts to the outer surface of the mouth portion of said heat insulating container so as to be freely raisable or lowerable, a cooking pot having a mouth portion and contained releasably in said heat insulating container, and a lid member for closing the mouth portion of said cooking pot, said heat insulating cooking vessel characterized in that:

said insulating container comprises a container member and attachment shafts which are formed to opposing sides of said container member and support said grip handle;

said lid comprises locking piece attached to opposing sides of said lid;

said grip handle is provided at said attachment parts thereof with an open portion which permits the free movement of said locking piece in the upper direction when said grip handle is lowered to one side of said container member, and with a concave shaped engaging part which covers said locking piece when said container member is covered by said lid, said engaging part comprising a bearing face at the inner surface thereof, said bearing face pressing said lid on to the mouth portion of said container member by pressing on said locking piece when said grip handle is placed in an upright position or is lowered to the other side of said container member;

said cooking pot comprising a pot member, tang portions provided opposite to each other on opposing walls of said pot member and extending upward, a grip handle extending portion extending from the upper end of said tang portion in the radial outward direction of said cooking pot and being formed so as to come in contact with the mouth portion of said container member and suspend said pot member so that there is a space between said pot member and said container member when said cooking pot is contained in said container member, and a grip portion attached to the end of said grip handle extending portion.

8. A heat insulating cooking vessel according to claim 7 characterized in that said container member consists of a metallic inner bottle and a metallic outer bottle joined in a unitary fashion at the edges of their respective openings, the upper edge of the opening of said container member supporting said grip handle extending portion.

9. A heat insulating cooking vessel according to claim 8 characterized in that a step portion, which supports the end of the grip handle extending portion and maintains the position of said cooking pot so that said cooking pot does not contact with the inner surface of said container member, is formed to said outer container handle.

10. A heat insulating cooking vessel according to claim 7 characterized in that a bearing portion is provided to the inner surface of said lid, said bearing portion pressing said lid member of said cooking pot, contained in said container member, on to said mouth portion of said cooking pot when said container member is closed with said lid.

11. A heat insulating cooking vessel according to claim 9 characterized in that a concavity is formed in the center of the lower surface of said lid, and a knob for insertion into said concavity is formed in the center of the upper surface of said lid member of said cooking pot, said concavity and said knob forming a bearing portion wherein said concavity applies pressing force to said lid member via said knob.

* * * * *